United States Patent
Isaji

(10) Patent No.: US 6,927,726 B2
(45) Date of Patent: Aug. 9, 2005

(54) RADAR

(75) Inventor: Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/790,993

(22) Filed: Mar. 1, 2004

(65) Prior Publication Data

US 2004/0174291 A1 Sep. 9, 2004

(30) Foreign Application Priority Data

Mar. 4, 2003 (JP) ........................................ 2003-057015

(51) Int. Cl.$^7$ .......................... G01S 13/32; G01S 13/93
(52) U.S. Cl. ........................ 342/196; 342/70; 342/118; 342/128; 342/159; 342/160; 342/175; 342/195; 701/300; 701/301
(58) Field of Search ................................ 701/300, 301; 342/159–164, 82–103, 118, 128–133, 175, 195–197, 70–72

(56) References Cited

U.S. PATENT DOCUMENTS 4,222,050 A * 9/1980 Kiuchi et al. ............... 342/162

FOREIGN PATENT DOCUMENTS

JP 2001-183450 7/2001

OTHER PUBLICATIONS

M.I. Skolnik, "Introduction to Radar Systems" (second edition); McGraw–Hill Book Company; New York; 1980; section 4.5, pp. 119–125.*
N.B. Lawrence et al., "Performance Results of an MTI/FFT Radar Signal Processor"; IEEE Publication CH1650–1/81/0000–0021 $00.75; copyrighted 1981.*
B. Liu, "Clutter Suppression Using Recursive and Nonrecursive MTI Filters"; IEEE Transactions on Aerospace and Electronic Systems; vol. 24, No. 3; May 1988; pp. 210–217.*
Patent Abstract of Japan, Publication No. 2001183450 A, Published on Jul. 6, 2001, in the name of Sayana.

* cited by examiner

Primary Examiner—Bernarr E. Gregory
(74) Attorney, Agent, or Firm—Christie, Parker and Hale, LLP

(57) ABSTRACT

A radar suppresses a dc component so as to improve the precision in processing a signal that belongs to a low-frequency band. The radar comprises a mixer that mixes a transmitted signal and a received signal, and an A/D converter that analog-to-digital converts an output signal of the mixer. The radar further includes: a removing unit that removes a dc voltage component by subtracting a predetermined removal voltage value from output data of the A/D converter; and an analyzing unit that Fourier-transforms data, which has the dc voltage component removed therefrom by the removing unit, so as to analyze the data.

8 Claims, 8 Drawing Sheets

RADAR

CROSS-REFERENCE TO RELATED APPLICATION

This application claims priority of Japanese Patent Application Number 2003-057015, filed on Mar. 4, 2003.

BACKGROUND OF THE INVENTION

1. Field of the Invention

The present invention relates to a radar or, more particularly, to a radar suitable for a vehicle and usable to help prevent collision or to realize automatic cruise control or automatic operation.

2. Description of the Related Art

Various forms of radar, including a frequency modulated-continuous wave (FM-CW) form and a pulsed-Doppler form, are adaptable to a radar that measures a distance between a vehicle and an object or a relative speed of an object to a vehicle. Above all, the FM-CW radar has the advantages of being relatively compact and inexpensive in circuitry and of simultaneously measuring both a distance between moving entities and a relative speed. Therefore, the FM-CW radar has been adopted for vehicles.

In general, the radar employs, as described in, for example, Japanese Unexamined Patent Publication No. 2001-183450, an analog-to-digital (A/D) converter because an analog signal received by a receiving antenna is converted into a digital signal and then processed digitally.

Incidentally, the A/D converter falls into a single-polarity power type that receives a voltage ranging from 0 V to any positive value (for example, ranging from 0 V to 5 V) and a dual-polarity power type that receives a voltage ranging from any negative value to any positive value. Normally, A/D converters incorporated in microprocessors and DSPs are of the single-polarity power type.

As for the radar, when a signal must be analyzed using a single-polarity power type A/D converter, a signal component must be appropriately biased (with a dc voltage). In this case, if fast Fourier transform (FFT) is adopted for the signal analysis, a low-frequency signal component may not be detected because of the adverse effect of a dc voltage, or information may be distorted.

Moreover, if a dual-polarity power type A/D converter is employed, a filter or the like is used to remove a dc component of a signal, and the resultant signal is analyzed through Fourier transform or the like. In this case, when a window function or the like is applied to the signal, a dc component may be produced. This adversely affects a low-frequency signal component.

SUMMARY OF THE INVENTION

The present invention attempts to solve the foregoing problem. An object of the present invention is to provide a radar that suppresses a dc component so as to improve the precision in processing a signal which belongs to a low-frequency band.

In order to accomplish the above object, according to the first aspect of the present invention, there is provided a radar comprising a mixer that mixes a transmitted signal and a received signal, and an A/D converter that analog-to-digital converts an output signal of the mixer. The radar further comprises: a processing unit for removing a dc voltage component by subtracting a predetermined removal voltage value from output data of the A/D converter and for Fourier-transforming data, that has the dc voltage component thereof removed by the processing unit, so as to analyze the data.

According to the second aspect of the present invention, preferably, the radar in accordance with the first aspect has a bias voltage application circuit included as a stage preceding the A/D converter. The processing unit uses a measurement of a voltage at a dc voltage source, which is employed by the bias voltage application circuit, as the removal voltage value.

Moreover, according to the third aspect of the present invention, preferably, the voltage measurement employed in the radar in accordance with the second aspect is obtained by measuring the voltage at the dc voltage source with no signal received by the bias voltage application circuit.

Moreover, according to the fourth aspect of the present invention, preferably, the radar in accordance with the third aspect further comprises a switch that discontinues conduction of a signal so as to establish a state in which no signal is received by the bias voltage application circuit.

Moreover, according to the fifth aspect of the present invention, preferably, the processing unit included in the radar in accordance with the first aspect calculates the removal voltage value on the basis of the output data of the A/D converter.

Moreover, according to the sixth aspect of the present invention, preferably, the processing unit included in the radar in accordance with the fifth aspect calculates the removal voltage value as an average of output data items of the A/D converter.

Moreover, according to the seventh aspect of the present invention, preferably, the processing unit included in the radar in accordance with the sixth aspect applies a window function to the data items that have the average subtracted therefrom. The processing unit calculates a second average by averaging the data items that have the window function applied thereto, and subtracts the second average from the data items that have the window function applied thereto.

Moreover, according to the eighth aspect of the present invention, preferably, the processing unit included in the radar in accordance with the first aspect performs digital filtering on the data items that have been treated by the processing unit so as to remove a low-frequency component.

Moreover, according to the ninth aspect of the present invention, preferably, the digital filtering employed in the radar in accordance with the eighth aspect is performed on the data items that have the window function applied thereto.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Referring to the appended drawings, embodiments of the present invention adapted to an FM-CW radar will be described below.

To begin with, the principles of measurement of a distance and a relative speed by means of an FM-CW radar will be described in conjunction with FIG. 1A, FIG. 1B, FIG. 2A, and FIG. 2B. The FM-CW radar transmits a continuous wave while frequency-modulating the wave, and receives echoes (reflected waves) from an object (obstacle) within a measurable range.

Figures 1A, 1B:
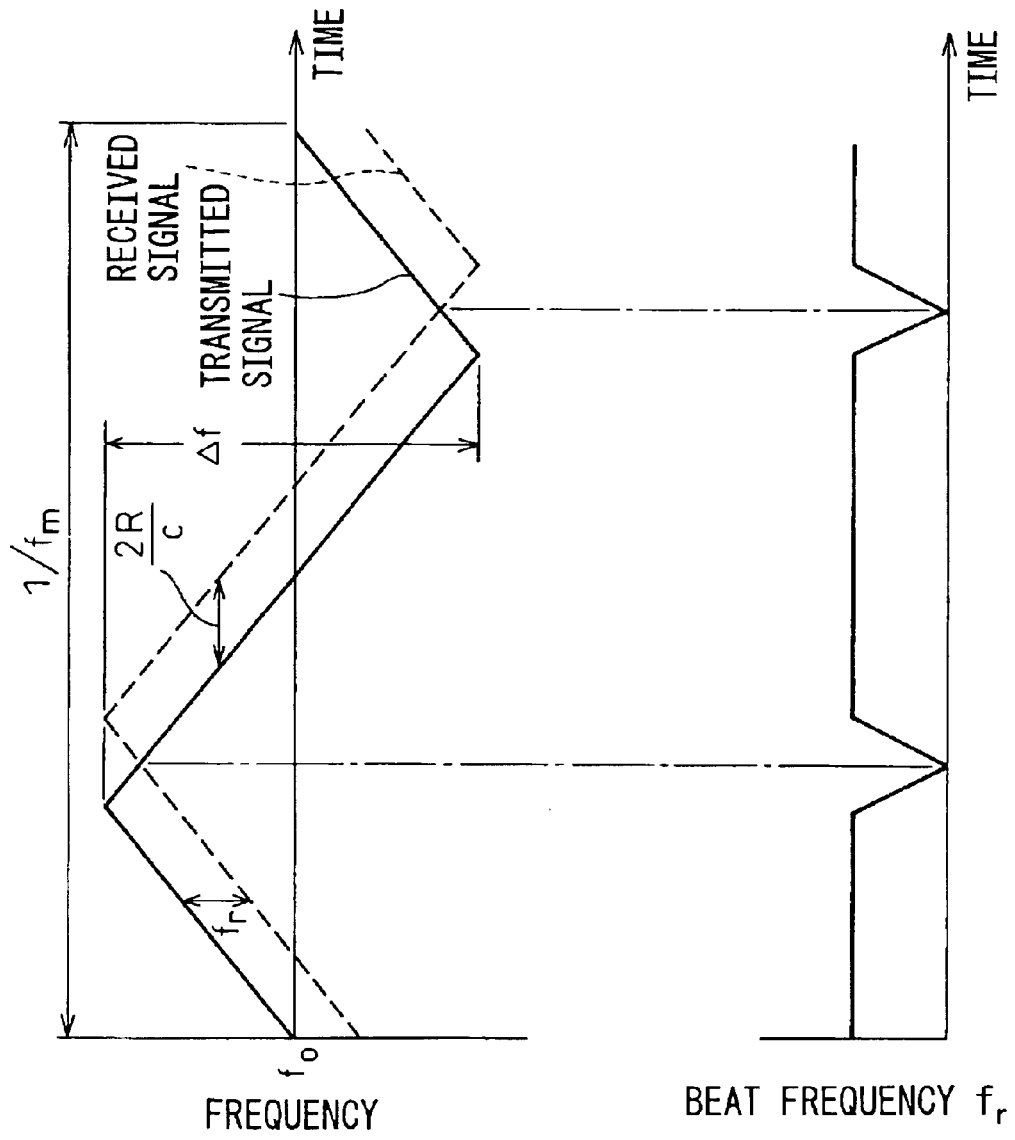
FIG. 1A and FIG. 1B show characteristic curves indicating the relationship between each of the frequencies of a transmitted signal and a received signal and a time, and the relationship between a beat frequency and a time on the assumption that a relative speed measured by an FM-CW radar is 0.

Herein, assuming that the frequency modulation (FM) is controlled using a triangular wave (that alternates within a range of $\pm \Delta f/2$ with a frequency $f_0$ as a center frequency), the relationship between the frequency of a transmitted signal and a time is plotted as a solid line in FIG. 1A.

Assuming that the relative speed of an object, which lies in a place separated by a distance R, to a radar is 0, the relationship between the frequency of a signal reflected from the object and a time is plotted as a dashed line in FIG. 1A. Consequently, one (beat frequency) $f_r$ of the frequencies of a beat-frequency signal resulting from mixing of a transmitted signal and a received signal (that is, a reflected signal) is indicated with the waveform shown in FIG. 1B.

Herein, assuming that the repetition frequency of a modulating triangular wave is $f_m$ and the velocity of light is c, the following relationship is established:

$$f_r/(2R/c) = (\Delta f/2)/\{(1/f_m)/4\}$$

$$\therefore R = f_r \cdot c / 4 f_m \Delta f$$

Consequently, the distance R can be calculated by measuring the beat frequency $f_r$.

Figures 2A, 2B:
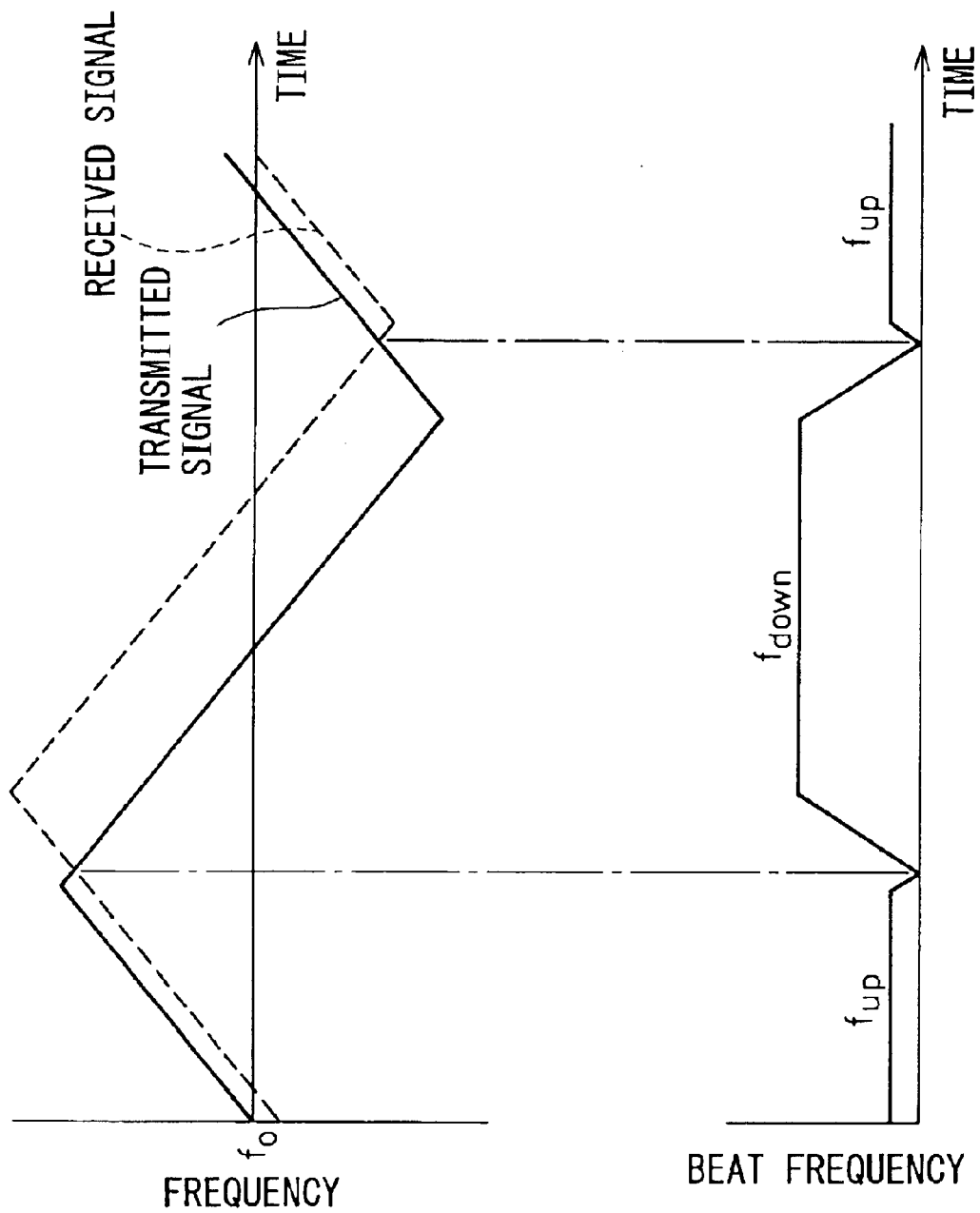
FIG. 2A and FIG. 2B show characteristic curves indicating the relationship between each of the frequencies of a transmitted signal and a received signal and a time, and the relationship between a beat frequency and a time on the assumption that the relative speed measured by the FM-CW radar is not 0.

If the relative speed of the object to the radar is not 0, the Doppler effect occurs. Therefore, the transmitted and received signals are plotted as shown in FIG. 2A. Consequently, a beat frequency $f_{up}$ obtained while the frequency of the transmitted signal is rising, and a beat frequency $f_{down}$ obtained while the frequency of the transmitted signal is falling are plotted as shown in FIG. 2B.

Namely, the frequencies $f_{up}$ and $f_{down}$ result from superimposition of the Doppler frequency $f_d$ to the beat frequency $f_r$ obtained when the relative speed is 0.

$$f_{up} = f_r - f_d$$

$$f_{down} = f_r + f_d$$

As already known, when a target makes a relative motion at a speed $v_r$, the frequency of a reflected wave that the radar receives becomes different from the frequency $f_0$ of the transmitted wave by a Doppler shift expressed as follows:

$$f_d = 2 \cdot v_r \cdot f_0 / c$$

where c equals a product of 3 by $10^8$ (m/s).

Consequently, the $f_{up}$ and $f_{down}$ values are measured and the $f_r$ and $f_d$ values are calculated using the $f_{up}$ and $f_{down}$ values. Eventually, the distance from the radar to the object and the relative speed of the object to the radar can be calculated.

Figure 3:
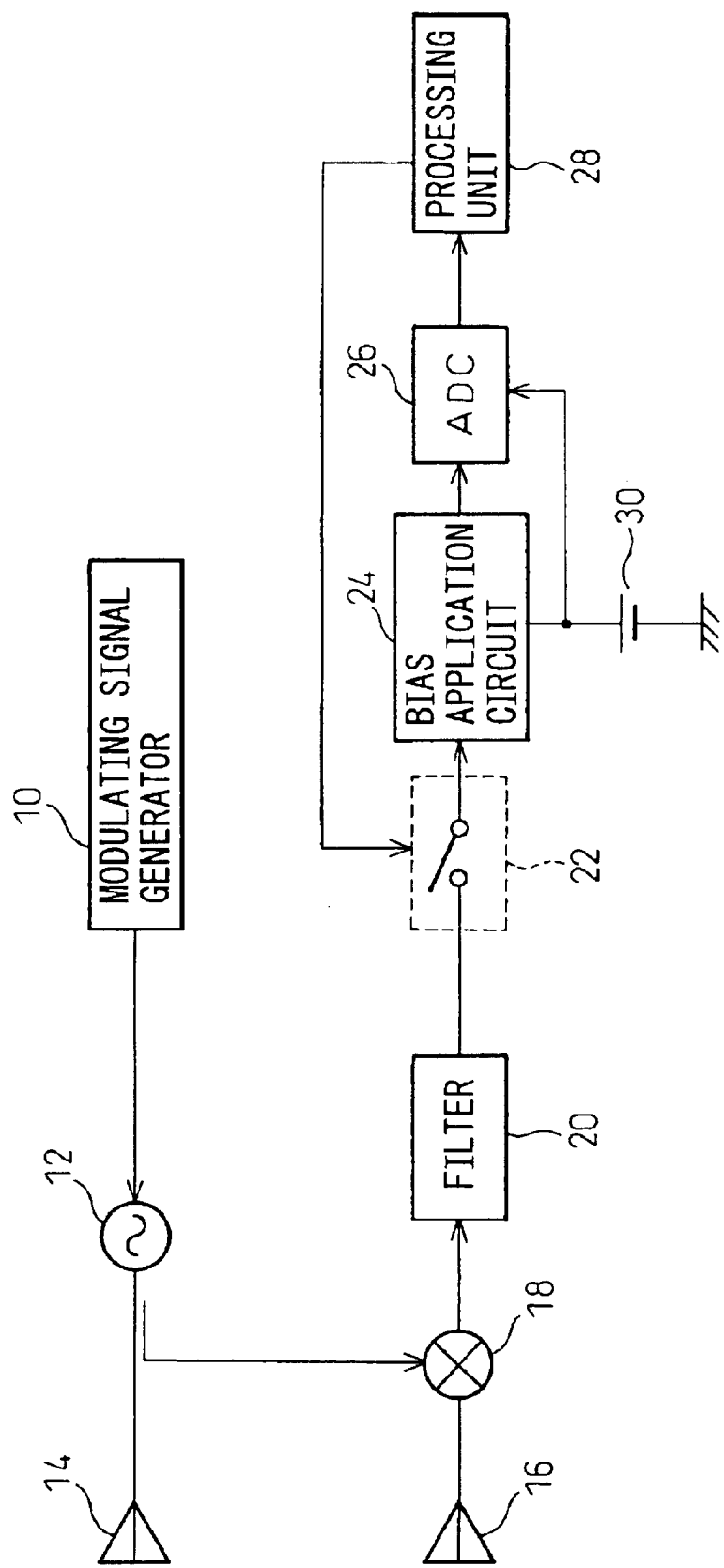
FIG. 3 is a block diagram showing the configuration of an FM-CW radar in accordance with a first embodiment of the present invention.

FIG. 3 is a block diagram showing the configuration of an FM-CW radar in accordance with a first embodiment of the present invention. Referring to the drawing, a modulating signal generator 10 generates a triangular signal as a modulating signal. A voltage-controlled oscillator 12 produces a transmitted signal that has been frequency-modulated (FM) based on the triangular signal. The transmitted signal is radiated as a transmitted wave (radio wave) from a transmitting antenna 14.

A receiving antenna 16 receives a reflected wave that is a reflected portion of the transmitted wave, and the received signal is transferred to a mixer 18. The mixer 18 mixes the received signal and transmitted signal to produce a beat-frequencies signal. The produced beat-frequencies signal is transferred to a processing unit 28 by way of a filter 20, a switching circuit 22, a bias application circuit 24, and an analog-to-digital (A/D) converter 26.

The processing unit 28 comprises a microprocessor or a digital signal processor (DSP), fast Fourier-transforms (FFT) the beat-frequencies signal for analysis, and calculates a distance to an object and the relative speed of the object according to the aforesaid principles of measurement.

Figure 4A:
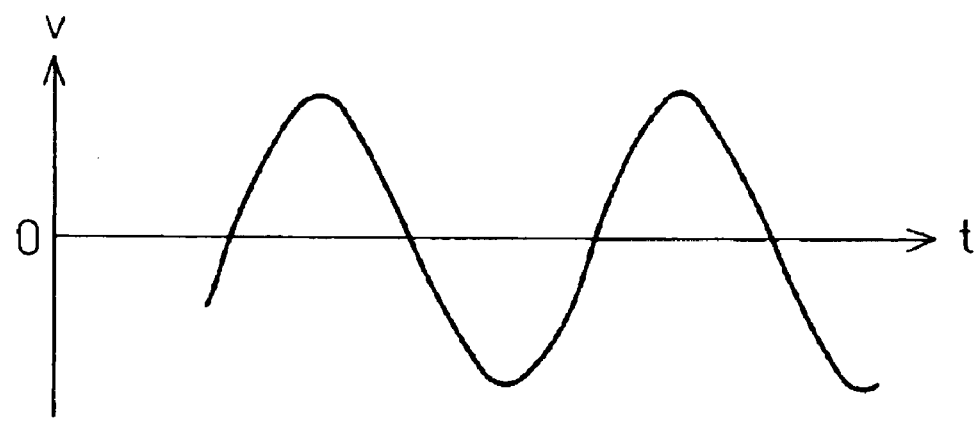
FIG. 4A and FIG. 4B show waveforms so as to present an example of the voltage of an input signal of a bias application circuit and an example of the voltage of an output signal thereof.
Figure 4B:
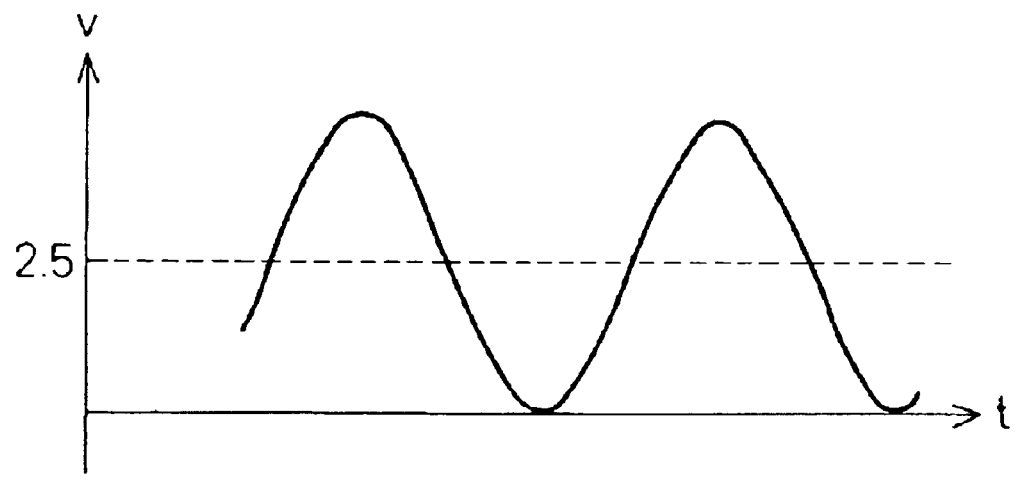

The A/D converter 26 is of the aforesaid single-polarity power type, and receives an input voltage ranging from 0 V to any positive value (for example, from 0 V to 5 V). Therefore, the bias application circuit 24 is included as a stage preceding the A/D converter 26. The bias application circuit 24 uses a dc voltage source 30 to apply a predetermined bias voltage (for example, 2.5 V) to an input signal. In other words, the bias application circuit 24 converts the voltage of an input signal like the one shown in FIG. 4A into the voltage of an output signal like the one shown in FIG. 4B.

However, the dc voltage source 30 does not always develop a constant voltage but develops a varying voltage. It is therefore hard for a succeeding stage to cope with the adverse effect of application of a bias voltage, that is, a dc voltage in a steady manner. As mentioned above, when a signal is analyzed in the frequency domain thereof resulting from fast Fourier transform (FFT) performed in the succeeding stage, the precision in detecting a low-frequency signal component is degraded due to the adverse effect of a dc voltage.

Figure 5:
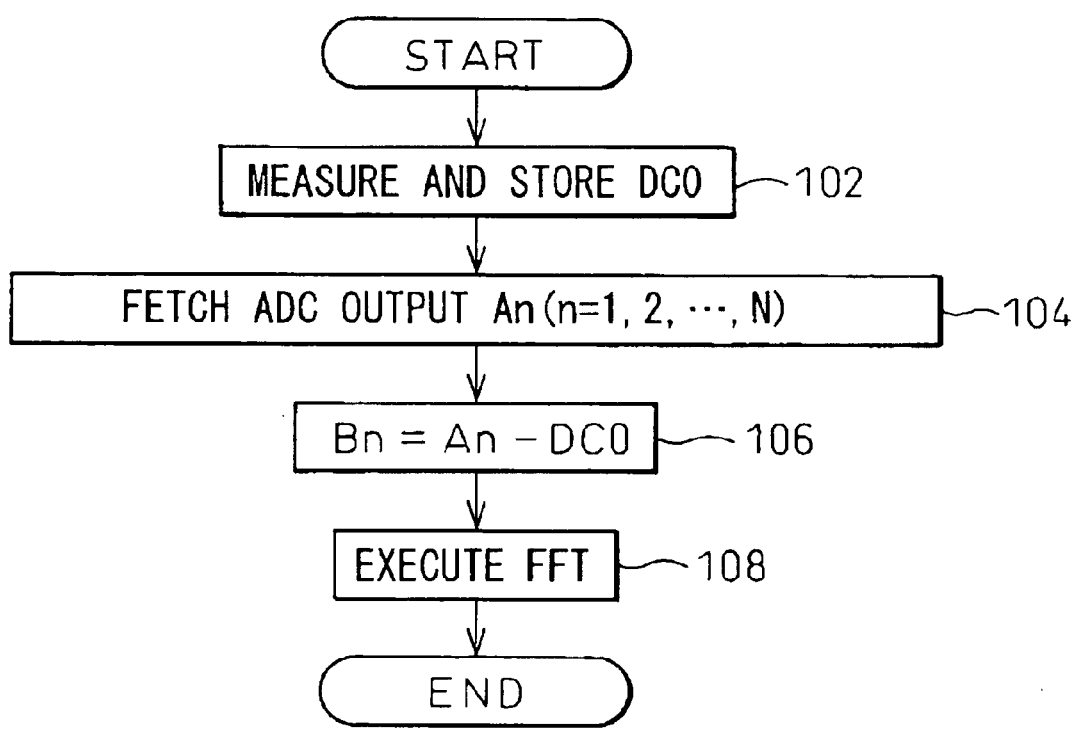
FIG. 5 is a flowchart describing a signal processing procedure to be executed by a processing unit included in the first embodiment of the present invention.

According to the first embodiment of the present invention, the voltage at the dc voltage source 30 is measured, and the measurement is subtracted from output data of the A/D converter 26. Thus, a dc voltage component is removed. The flowchart of FIG. 5 describes a concrete procedure to be executed by the processing unit 28.

First, at step 102, the value of the voltage at the dc voltage source 30 is converted into digital data DC0 by the A/D converter 26 in order to measure the voltage. The digital data DC0 is stored as a dc voltage component, that is, a removal voltage value. In order to improve the precision in measurement, the voltage should preferably be measured with no signal received by the bias application circuit 24. In particular, according to the present embodiment, the switching circuit 22 that discontinues conduction of a signal is included as a stage preceding the bias application circuit 24 in order to forcibly establish a state in which no signal is received by the bias application circuit 24.

Thereafter, at step 104, the output data items of the A/D converter 26, that is, N digital data streams An (where n=1, 2, ..., N) serving as the beat-frequencies signal are fetched.

At step 106, an arithmetic operation is performed according to the following expression:

$$Bn=An-DC0$$

The removal voltage value DC0 that is a dc voltage component is removed from each of the data streams An (where n=1, 2, ..., N), whereby data streams Bn (where n=1, 2, ..., N) are worked out.

At the last step 108, the beat-frequencies signal having the dc component removed therefrom, that is, the data streams Bn (where n=1, 2, ..., N) are fast Fourier-transformed, and then frequency-analyzed based on the principles of measurement.

According to the first embodiment, the voltage at the dc voltage source is measured and a dc component is canceled. A description will be made of embodiments in which a dc voltage component, that is, a removal voltage value is calculated using the output data of the A/D converter 26. The subsequent embodiments are adaptable to a radar that includes the A/D converter 26 which is shown in FIG. 3 but is of the dual-polarity power type, but that excludes the switching circuit 22, bias application circuit 24, and dc voltage source 30.

Figure 6:
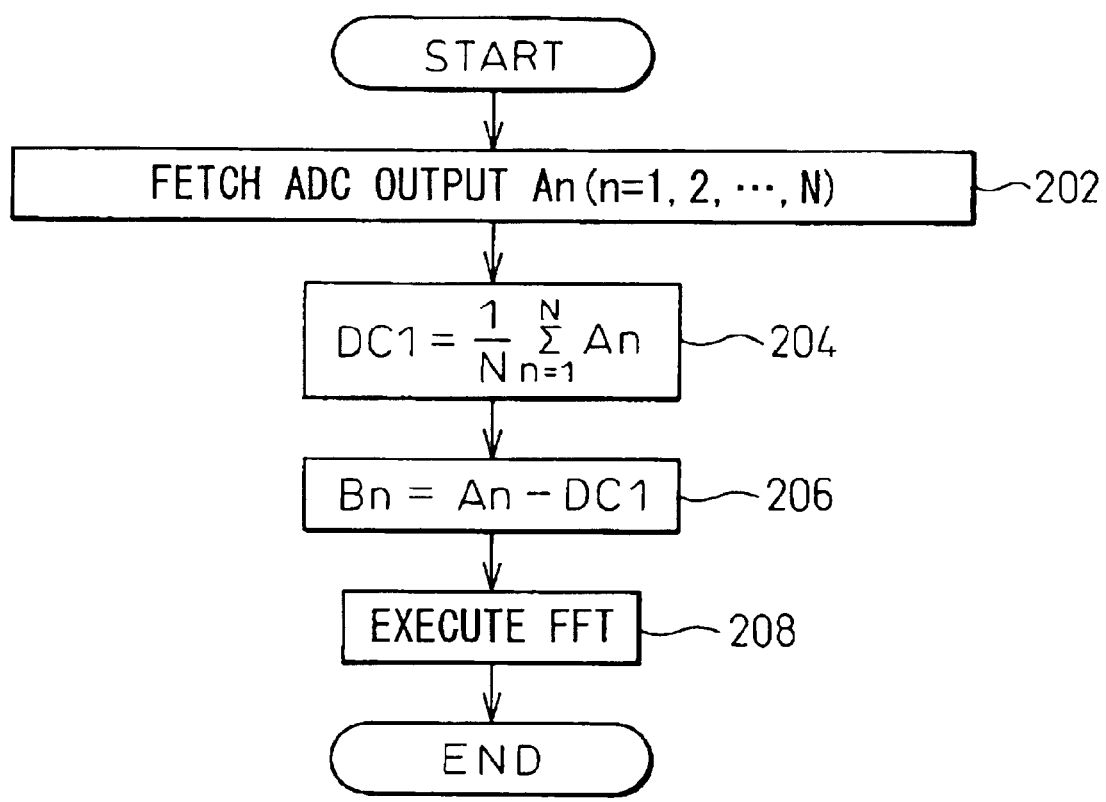
FIG. 6 is a flowchart describing a signal processing procedure to be executed by a processing unit included in the second embodiment of the present invention.

FIG. 6 is a flowchart describing a signal processing procedure to be executed by the processing unit 28 included in a second embodiment of the present invention. First, at step 202, the output data items of the A/D converter 26, that is, N digital data streams An (where n=1, 2, ..., N) serving as a beat-frequencies signal are fetched.

At step 204, an arithmetic operation is performed according to the following expression:

$$DC1=(1/N)\Sigma An$$

A dc voltage component, that is, a removal voltage value D1 is calculated as an average of the output data items of the A/D converter 26.

At the next step 206, an arithmetic operation is performed according to the follow expression:

$$Bn=An-DC1$$

The dc voltage component, that is, the removal voltage value DC1 is removed from each of the data streams An (where n=1, 2, ..., N), whereby data streams Bn (where n=1, 2, ..., N) are worked out.

At step 208, the beat-frequencies signal having the dc voltage component removed therefrom, that is, the data streams Bn (where n=1, 2, ..., N) are fast Fourier-transformed (FFT), and then frequency-analyzed based on the aforesaid principles of measurement. According to the second embodiment, a dc component is canceled based on the output data itself of the A/D converter 26.

Figure 7:
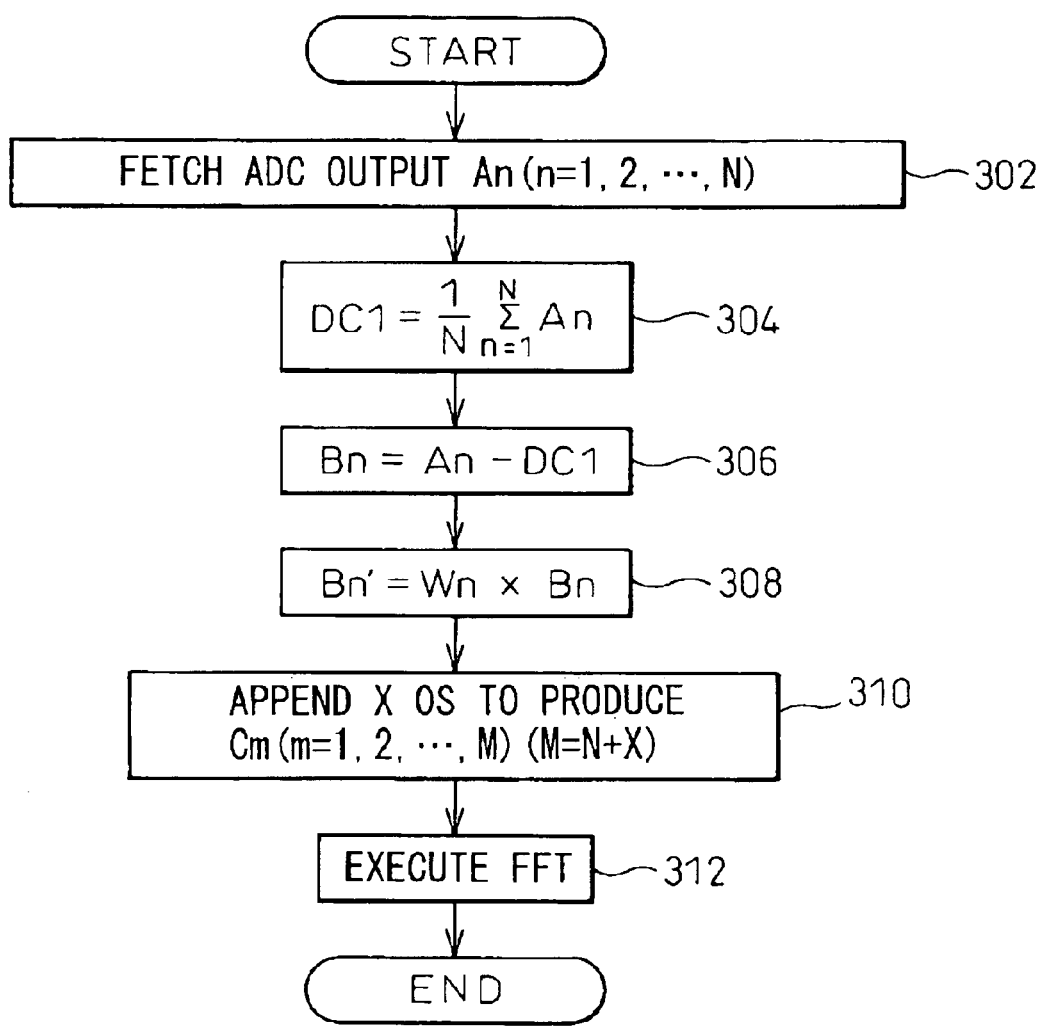
FIG. 7 is a flowchart describing a signal processing procedure to be executed by a processing unit included in the third embodiment of the present invention.

FIG. 7 is a flowchart describing a signal processing procedure to be executed by the processing unit 28 included in a third embodiment that is an improvement on the foregoing second embodiment. The contents of steps 302, 304, and 306 are identical to those of the step 202, 204, and 206 described in FIG. 6 and employed in the second embodiment.

At step 308, an arithmetic operation is performed according to the following expression:

$$Bn'=Wn \times Bn$$

A predetermined window function Wn is applied to data streams Bn (where n=1, 2, ..., N) resulting from removal of a dc component. Namely, part of each input data stream is extracted for use, or, in other words, windowing is performed.

Thereafter, at step 310, X 0s are appended to data streams Bn' resulting from the windowing in order to produce new data streams Cm (where m=1, 2, ..., M) (M=N+X). In other words, up-sampling (interpolation) is performed in order to expand a time base by intentionally appending a certain number of 0s. Thus, a frequency resolution is improved.

At the last step 312, the data streams Cm (where m=1, 2, ..., M) are fast Fourier-transformed (FFT), and then frequency-analyzed based on the aforesaid principles of measurement.

Figure 8:
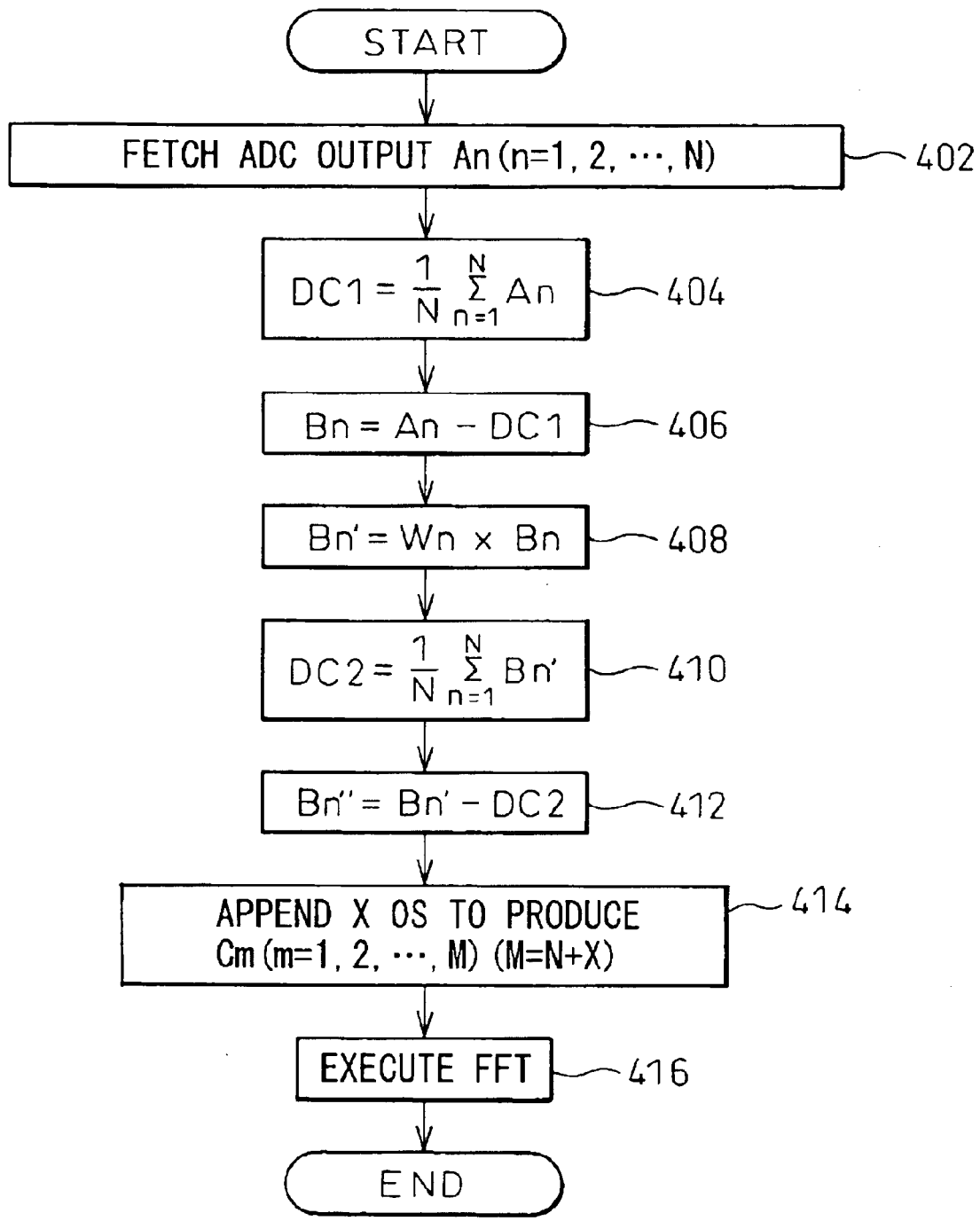
FIG. 8 is a flowchart describing a signal processing procedure to be executed by a processing unit included in the fourth embodiment of the present invention.

FIG. 8 is a flowchart describing a signal processing procedure to be executed by the processing unit 28 included in a fourth embodiment that is an improvement of the third embodiment. The contents of steps 402, 404, 406, and 408 are identical to those of the steps 302, 304, 306, and 308 described in FIG. 7 and employed in the third embodiment.

At step 410, an arithmetic operation is performed according to the following expression:

$$DC2=(1/N)\Sigma Bn'$$

A second dc voltage component, that is, a second removal voltage value DC2 is calculated as an average of the data streams Bn' resulting from windowing. This is because the application of a window function may generate a new dc component.

Thereafter, at step 412, an arithmetic operation is performed according to the following expression:

$$Bn''=Bn'-DC2$$

The second removal voltage value DC2 is removed from each of the data streams Bn' (where n=1, 2, ..., N), whereby data streams Bn" (where n=1, 2, ..., N) are calculated.

At step 414, X 0s are appended to the data streams Bn" (where n=1, 2, ..., N) in order to produce new data streams Cm (where m=1, 2, ..., M) (M=N+X). At the last step 416, the data streams Cm (where m=1, 2, ..., M) are fast Fourier-transformed (FFT) and then frequency-analyzed based on the aforesaid principles of measurement.

Since an unremoved dc component may remain in data having a dc component removed therefrom as mentioned above, digital filtering should preferably be executed in order to remove the dc component (low-frequency component). Moreover, digital filtering may be performed on data that has a window function applied thereto.

Several embodiments of the present invention have been described so far. Needless to say, the present invention is not limited to those embodiments but other various embodiments can be adopted.

As described so far, according to the present invention, there is provided a radar that suppresses a dc component so as to improve the precision in processing a signal in a low-frequency band.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A radar comprising:
   a mixer that mixes a transmitted signal and a received signal;
   an A/D converter that analog-to-digital converts an output signal of said mixer to an output data;
   a processing unit that removes a dc voltage component by subtracting a predetermined voltage value from output data of said A/D converter, and Fourier-transforms data, which has the dc voltage component removed therefrom by said processing unit; and
   a bias voltage application circuit as a stage preceding said A/D converter, wherein said processing unit adopts a measurement of a voltage at a dc voltage source, which is employed by said bias voltage application circuit, as the removal voltage value.

2. The radar according to claim 1, wherein said voltage measurement is obtained by measuring the voltage at said dc voltage source with no signal received by said bias voltage application circuit.

3. The radar according to claim 2, further comprising a switch that discontinues conduction of a signal so as to establish a state in which no signal is received by said bias voltage application circuit.

4. A radar comprising:
   a mixer that mixes a transmitted signal and a received signal;
   an A/D converter that analog-to-digital converts an output signal of said mixer to an output data; and
   a processing unit that removes a dc voltage component by subtracting a predetermined voltage value from output data of said A/D converter, and Fourier-transforms data, which has the dc voltage component removed therefrom by said processing unit, wherein said processing unit calculates the removal voltage value on the basis of the output data of said A/D converter.

5. The radar according to claim 4, wherein said processing unit calculates the removal voltage value as an average of output data items of said A/D converter.

6. The radar according to claim 5, wherein said processing unit applies a window function to the data that have the average subtracted therefrom, calculates a second average by averaging the data that have the window function applied thereto, and subtracts the second average from the data that have the window function applied thereto.

7. A radar comprising:
   a mixer that mixes a transmitted signal and a received signal;
   an A/D converter that analog-to-digital converts an output signal of said mixer to an output data; and
   a processing unit that removes a dc voltage component by subtracting a predetermined voltage value from output data of said A/D converter, and Fourier-transforms data, which has the dc voltage component removed therefrom by said processing unit, wherein digital filtering is performed on the data treated by said processing unit in order to further remove a low-frequency component.

8. The radar according to claim 7, wherein digital filtering is performed on the data that has the window function applied thereto.

* * * * *